Patented Apr. 17, 1945

2,373,996

UNITED STATES PATENT OFFICE 2,373,996

ELECTRICAL INSULATION

Joseph N. Borglin, Wilmington, Del., assignor to Hercules Powder Company, Wilmington, Del., a corporation of Delaware No Drawing. Application April 18, 1941,
Serial No. 389,179

2 Claims. (Cl. 106—220)

This invention relates to electrical insulating compositions and electrical conductors insulated therewith. More particularly, it relates to electrical insulation comprising polymerized rosin.

Ordinary rosin or colophony has long been used in electrical insulation, sometimes alone, but usually in admixture with other components which modify its properties. The use of rosin in this field has been subject to very great disadvantages which have not heretofore been overcome. Among these are its objectionable tendency to deteriorate and break down with the passage of time. In addition, it crystallizes readily, losing its amorphous character and its desirable characteristics. Moreover, its low melting point is a serious disadvantage. Another objection is its poor resistance to water and to moisture which cause it to change to an undesirable material. Still another serious disadvantage of ordinary rosin is its great brittleness and its lack of resistance to impact and other external forces. The lack of flexibility and the shattering nature of ordinary rosin are very well known. All of these objections have served to deter the use of rosin in the electrical insulation field. Numerous efforts have been made to dispense altogether with the use of rosin in this field because of these undesirable properties. However, these attempts have not been successful because rosin possesses certain properties which cannot be economically duplicated with any other material.

The principal object of the present invention is to provide electrical insulation overcoming, to a large extent, the disadvantages referred to above.

Another object is to overcome these disadvantages to a large extent by the use of a material derived from rosin by a particular chemical treatment thereof.

Another object is to provide an improved electrical insulating material.

Another object is to provide an improved combination of an electrical conductor and an insulating material therefor, having improved dielectric properties.

Still another object is to provide an improved electrical insulating composition and the combination of a conductor in association therewith.

Still other objects will appear hereinafter.

In accordance with the present invention, the foregoing objects are, in general, accomplished by using polymerized rosin as an electrical insulating material or in an electrical insulating composition to be used in association with an electrical conductor for insulating the same. I have discovered that polymerized rosin exhibits properties which are greatly superior to rosin in the field of electrical insulation.

Polymerized rosin is rosin which has been chemically treated in known manner to polymerize the rosin, and is characterized by a molecular weight of from about 5% to about 200% greater than ordinary rosin in its pure state, a melting point as determined by the Hercules drop method above 85° C., usually at least 100° C., and in general of from about 5° C. to about 100° C. above that of the untreated ordinary rosin. Polymerized rosin is further characterized by substantial freedom from hardening substances held in combination, an iodine value lower than that of ordinary rosin, and an acid number ranging from that of the original rosin down to about 100. In accordance with the present invention, it is preferred to use polymerized rosin having a melting point (drop) of at least about 100° C. This polymerized rosin may have been obtained from ordinary rosin by polymerization with sulfuric acid, phosphoric acid, amphoteric metal chlorides, etc. followed by separation of catalyst and refining, if desired, in any suitable manner. Typical methods of polymerizing rosin are shown in U. S. patents to Rummelsburg, Nos. 2,108,928 and 2,136,525 and to Morton No. 2,017,866.

In accordance with the present invention the polymerized rosin may be used by itself as the electrical insulating material in which case it displays properties considerably improved over ordinary rosin for such use, such as markedly reduced tendency to crystallization, reduced tendency to oxidation and deterioration with the passage of time and on exposure to aging influences, a higher melting point which makes it less susceptible to temperature changes, improved water resistance which causes it to display improved insulating characteristics in humid conditions or in conditions where it is exposed to the action of water in liquid form. Other advantages are the greatly reduced shattering tendency of polymerized rosin, the higher flexibility, and the greater resistance to impacts and other external forces. Polymerized rosin by itself may advantageously be used in place of ordinary rosin, in, for example, the potting of electrical coils and in other fields.

Generally, however, it is preferred to use the polymerized rosin in admixture with other materials which modify its properties. For example, electrical insulating compositions may be formulated which comprise polymerized rosin in conjunction with a modifying agent which exerts a plasticizing or softening action upon the polymerized rosin. Examples of such materials are: oils such as drying oils, for example, tung, linseed, soybean, sunflower, menhaden, semi-drying oils such as corn, cottonseed, rapeseed, etc., non-drying oils such as castor, peanut, olive, etc., mineral oils such as refined petroleum oil; fatty acids derived from the naturally occurring vegetable and animal oils such as stearic acid, palmitic acid, oleic acid, and other aliphatic straight-chain higher fatty acids having more than 12 carbon atoms; waxes and wax-like materials such as paraffin, ozokerite, Japan wax, beeswax, montan wax, candelilla wax, carnauba wax, synthetic waxes such as, for example, hydrogenated castor oil known in the trade as "Opalwax," etc.; or ether and ester plasticizers compatible with the polymerized rosin such as, for example, benzyl ether of glycerine, methyl abietate, ethyl abietate, hydrogenated methyl abietate, acetin, various glycolates, butyl stearate, triphenyl phosphate, tricresyl phosphate, dibutyl phthalate and other phthalates, etc. The amount of this substantially non-volatile modifying agent may vary from about 0.5% to about 25% by weight of the composition and preferably from about 5% to about 15% thereof. The foregoing substances may be added either singly or as a mixture of 2 or more thereof. The liquid modifying agents serve particularly to reduce the brittleness of the composition while the fatty acids and waxy materials also function as fluxing agents to give better combination of the polymerized rosin with any other constituents which may be present.

Preferably, the polymerized rosin is used in combination with another resin, natural or synthetic, which is fusible, which has a melting point of at least about 95° C., and an acid number not over about 150. Examples of such resinous materials are sandarac, red and yellow gum accroides, shellac, copals such as East African, West African, Sierra Leone, Congo copal, Angola copal, kauri, Boea, Manilla, pontianak, etc., dammar such as Batavian dammar, etc. Synthetic resins may be employed such as coumarone indene resins, oil soluble phenol aldehyde type resins, oil soluble alkyds, etc. The amount of such additional resin will vary considerably depending upon the final product desired but in general will fall within the range of from about 10% to about 90% of the composition and preferably from about 20% to 60% thereof.

Generally, the amount of polymerized rosin employed in the composition will vary between about 10% and about 90% and preferably between about 30% and about 70%. For example, compositions comprising about equal parts by weight of polymerized rosin and of gum accroides with or without suitable quantities of the modifying agent referred to above have been found to give extremely satisfactory results.

If desired, other materials may be introduced into the mixture, for example, dyes, pigments, fillers, aggregates, etc. may be incorporated. Ordinary rosin may be incorporated in amount up to 25% of the composition although usually it is desirable to omit it altogether.

The composition may take the form of a moldable plastic which is molded into the desired shape. Alternatively, the composition may be applied to the electrical conductor in the molten form or in solution in a suitable solvent, or it may be applied to a suitable fibrous backing material such as fabric or paper or the like which is subsequently applied to the electrical conductor. For example, in accordance with the present invention, polymerized rosin may be used in place of ordinary rosin in the manufacture of varnished cambric. Polymerized rosin has also been advantageously employed in the manufacture of electrical insulating tape by employing a composition containing the polymerized rosin with suitable modifiers to a suitable fabric backing. Varnishes made with polymerized rosin instead of ordinary rosin have been advantageously applied in the enameling of the copper wire used as the electrical conductor. In all of these applications, the polymerized rosin readily demonstrates its marked advantages over ordinary rosin of more effectively resisting deteriorating influences such as heat, light, oxidation, impact, water, etc.

Following are typical examples of electrical insulating compositions made in accordance with the present invention. In these examples, the polymerized rosin employed was made by the sulfuric acid polymerization of ordinary wood rosin and had a melting point of about 100° C. and an acid number of 150-155.

*Example 1*

| | Per cent by weight |
|---|---|
| Polymerized rosin | 25 |
| Shellac | 40 |
| Congo copal (run) | 25 |
| Tung oil | 6 |
| Benzyl ether of glycerine | 4 |

The resins were melted together whereupon the tung oil and the benzyl ether of glycerine were stirred into the mixture. The resulting material possessed good bonding properties and displayed excellent electrical insulating characteristics.

*Examples 2 to 9*

| | Example No. | | | | | | | |
|---|---|---|---|---|---|---|---|---|
| | 2 | 3 | 4 | 5 | 6 | 7 | 8 | 9 |
| | Per cent by weight | Per cent by weight | Per cent by weight | Per cent by weight | Per cent by weight | Per cent by weight | Per cent by weight | Per cent by weight |
| Polymerized rosin | 44.44 | 44.44 | 44.44 | 44.44 | 44.44 | 90 | 50 | 10 |
| Gum accroides | 44.44 | 44.44 | 44.44 | 44.44 | 44.44 | 10 | 50 | 90 |
| Castor oil | 8.88 | | | | 8.88 | | | |
| Stearic acid | 2.22 | 8.88 | | | | | | |
| Rapeseed oil | | 2.22 | | | | | | |
| Peanut oil | | | 11.11 | | | | | |
| Sunflower oil | | | | 11.11 | | | | |
| Japan wax | | | | | 2.22 | | | |

In each of these formulations, the polymerized rosin and the gum accroides were melted together by heating to 175-225° C., stirring well and holding until solution has taken place, discontinuing the heating, adding the modifying agents where used, stirring and allowing to cool for subsequent use. Each of the formulations exhibited very satisfactory electrical insulating properties.

Examples 10 to 16

|  | Example No. | | | | | | |
|---|---|---|---|---|---|---|---|
|  | 10 | 11 | 12 | 13 | 14 | 15 | 16 |
|  | Per cent by weight | Per cent by weight | Per cent by weight | Per cent by weight | Per cent by weight | Per cent by weight | Per cent by weight |
| Polymerized rosin | 50 | 32 | 50 | 50 | 50 | 50 | 50 |
| Beeswax | 40 | | | | | | |
| Montan wax | | 40 | 40 | | | | |
| Carnauba wax | | | | 40 | | | |
| Japan wax | | | | | 40 | | |
| Paraffin | | | | | | 40 | |
| Candelilla wax | | | | | | | 40 |
| Castor oil | 10 | 28 | | | | | |
| Rapeseed oil | | | 10 | | | | |
| Peanut oil | | | | 10 | | | |
| Menhaden oil | | | | | 10 | | |
| Corn oil | | | | | | 10 | |
| Sunflower oil | | | | | | | 10 |

The polymerized rosin and the wax were melted together and heated to 150° C. and held there for 30 minutes whereupon the oily modifying agent was introduced. The composition was stirred thoroughly and heated to 160° C. whereup a fabric tape was immersed therein and thoroughly impregnated therewith, withdrawn and allowed to drain. The resulting electrical insulating tape exhibited properties which were much superior to those of an electrical insulating tape made with similar compositions wherein rosin was employed instead of polymerized rosin.

Example 17

Light current transformer coils of the type used in communication work were saturated in the usual way and then potted in a metal can with molten polymerized rosin instead of ordinary rosin. Upon cooling, there was obtained a transformer which was considerably better than a similar transformer potted in ordinary rosin.

From the foregoing, it will be seen that the present invention gives rise to a number of advantages over the prior art electrical insulating materials. Numerous other advantages of the electrical insulation of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. An electrical insulating composition comprising polymerized rosin and gum accroides.

2. An electrical insulating composition comprising by weight approximately 44% of polymerized rosin, 44% of gum accroides, 8% parts of castor oil, and 2% parts of stearic acid.

JOSEPH N. BORGLIN.